United States Patent [19]

Fister

[11] 3,735,232
[45] May 22, 1973

[54] LOW COST UNIVERSAL BATTERY CHARGER FOR SMALL TYPE NICKEL-CADMIUM OR ALKALINE BATTERIES

[76] Inventor: Karoly G. Fister, 701 Louise Drive, Mentor, Ohio 44060

[22] Filed: June 8, 1971

[21] Appl. No.: 151,078

[52] U.S. Cl. ................................................320/2
[51] Int. Cl. ..........................................H01m 45/04
[58] Field of Search ...................320/2, 5, 6, 15–19, 320/30, 31, 34, 35, 36, 39, 40

[56] References Cited

UNITED STATES PATENTS

| | | | |
|---|---|---|---|
| 3,217,227 | 11/1965 | Sherwood | 320/2 UX |
| 3,102,222 | 8/1963 | Harmer | 320/36 |
| 2,979,650 | 4/1961 | Godshalk et al. | 320/35 |
| 3,021,468 | 2/1962 | Reich | 320/6 X |
| 2,418,141 | 4/1947 | Salazar | 320/2 X |
| 3,579,075 | 5/1971 | Floyd | 320/2 |
| 3,307,096 | 2/1967 | Lyon | 320/2 UX |

FOREIGN PATENTS OR APPLICATIONS

| | | | |
|---|---|---|---|
| 1,004,159 | 11/1951 | France | 320/30 |

*Primary Examiner*—J. D. Miller
*Assistant Examiner*—Robert J. Hickey
*Attorney*—Charles W. Helzer and Thomas E. Beall, Jr.

[57] ABSTRACT

A low cost universal battery charger for recharging different size rechargable small batteries of the "A-—A", "C", and "D" nickel-cadmium, alkaline or "dry cell" type directly from an automobile or other 6–12 volt battery source of direct current using only passive components. The battery charger comprises a molded insulating housing a plurality of separate different size compartments each dimensioned to receive respective different ones of the small batteries to be recharged. Internal contacts are secured within each of the compartments for physically engaging the terminals of the respective size batteries to be recharged in that compartment and to establish a closed electrical circuit through the battery. External contacts are mounted on the exterior of the insulating housing and are electrically connected to respective ones of the internal contacts for connecting the different size batteries disposed in the compartments in circuit relationship with a recharging direct current voltage source that preferably comprises an automobile battery of 6–12 volt rating. Conductors having readily detachable terminal connectors serve to connect the external contacts to the automobile battery serving as a recharging direct current voltage source to thereby energize the different size battery receiving compartments within the housing. A plurality of different value current adjusting (voltage dropping) resistors preferably are molded within the battery housing and means are provided for selectively connecting a desired value current adjusting resistor in circuit relationship with the automobile battery recharging direct current voltage source and the interval contact means of the different size battery receiving compartments for adjusting the value of the charging current supplied to each of the compartments to a preselected desired value in accordance with the rating of the small battery to be recharged in that compartment. Additionally, plug-in resistors and suitable receptacles are provided in certain forms of the invention for connecting additional resistors in parallel circuit relationship with the molded-in current adjusting resistors for appropriately adjusting the current value supplied to a given battery receiving compartment to a different current value whereby the battery receiving compartment can accommodate batteries of the same physical size but requiring different value recharging currents. Also, a second receptacle can be formed in the insulating housing for receiving detachable thermally sensitive switches which are connected in series circuit relationship with the internal contacts of at least one of the battery receiving compartments whereby the thermally sensitive switch physically senses the temperature of the battery being recharged and interrupts the recharging current upon an over-temperature condition being sensed. If desired the thermally sensitive switch can be permanently built into the battery recharger rather than making it in the form of a detachable attachment and preferably comprises a bimetal switch. In still a different form of the invention the plurality of different value current adjusting resistors are comprised by resistive cables which have different values of resistance and also serve as the conductor for selectively connecting the external contacts to the automobile battery serving as a recharging direct current voltage source. In still another form of the invention, the plurality of different value current adjusting resistors is comprised by a single multi-tap resistor and a selector switch is provided for connecting a desired value of current adjusting resistance in circuit relationship with the automobile battery serving as the recharging direct current voltage source and the internal contacts of a selected one of the different size battery receiving compartments.

10 Claims, 4 Drawing Figures

United States Patent
Fister
[11] 3,735,232
[45] May 22, 1973
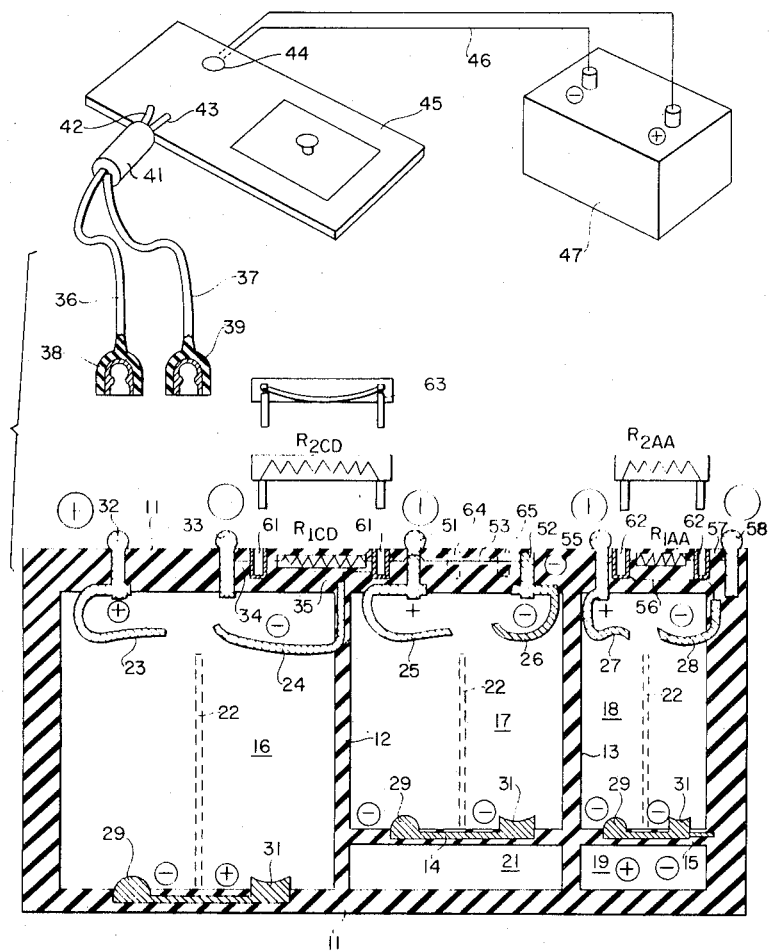

INVENTOR
KAROLY G. FISTER

Charles W. Helzer
ATTORNEY

LOW COST UNIVERSAL BATTERY CHARGER FOR SMALL TYPE NICKEL-CADMIUM OR ALKALINE BATTERIES

BACKGROUND OF INVENTION

1. Field Of Invention

This invention relates to a new and improved low cost universal battery charger for small batteries of the "dry cell" type which are susceptable to being recharged.

More particularly, the invention relates to a low cost multi-purpose battery charger for recharging small batteries such as rechargable nickel-cadmium (Ni-Cd) or rechargable alkaline batteries of the "C", "D" or "A—A" size, rechargable "dry cell" batteries, rechargable 9-volt rectangular-shaped Ni-Cd batteries, and the like from a recharging direct current voltage source such as a 6–12 volt automobile battery or other similar direct current voltage source.

2. Prior Art Situation

There are a number of battery chargers available commercially for use in recharging small batteries of the "dry cell" type such as rechargable Ni-Cd and alkaline batteries of the "C", "D" or "A—A" size. One such multipurpose charger is described in an earlier patent and is capable of accommodating some, if not all, of these sizes. However, this known prior art battery charger must operate from an alternating current supply and requires the use of a multi-tap transformer, rectifiers, filter capacitors and the like to derive the desired value recharging currents. Because of these characteristics, prior known battery chargers of this type are relatively expensive costing on the order of $20–$30 or more, and are prohibitively expensive for most families. This situation poses a particular hardship on those families with small children who may have battery operated toys, flashlights, etc and whose consumption of small batteries of the dry cell type can become financially burdensome. However, because of the relatively high cost of the known battery chargers operating from alternating current sources, or the limited capability of known, cheaper, direct current operated battery chargers, no satisfactory, low cost, multi-purpose or universally usable battery charger has been available to meet the needs of such families. To meet this need the present invention was devised.

SUMMARY OF INVENTION

It is therefore a primary object of the present invention to provide a new and improved lost cost, universal, multi-purpose battery charger for recharging different size, small batteries of the "dry cell" type and which is capable of use with a charging direct current voltage source such as a 6–12 volt automobile battery whereby the need for costly alternating current conversion components may be obviated.

In practicing the invention, a low cost, universal, multi-purpose battery charger is provided for recharging different size, rechargable small batteries of the "A—A", "C" and "D" or "dry cell" type which are susceptible to being recharged. The battery charger comprises a housing that preferably is of molded insulating construction and has a plurality of separate sized compartments each dimensioned to receive respective different ones of the small batteries to be recharged. Internal contact means are secured within each of the battery receiving compartments for physically engaging the terminals of the respective size battery to be recharged in that compartment and to establish a closed electrical circuit through the battery. External contact means are mounted on the exterior of the housing and are electrically connected through appropriate molded-in conductors to respective ones of the internal contact means for connecting the different size batteries disposed in the compartment in circuit relationship with a recharging direct current voltage source such as a 6–12 volt automobile battery. Conductor means having readily detachable terminal connectors in the form of pressure clips, snap-on contacts, threaded stud and screw on cap, mated male and female prong connectors, or the like are provided for selectively connecting the external contact means to a recharging direct current voltage source to thereby energize the different size battery receiving compartments. The terminal connectors on the conductor means may be adapted to connect the external contacts of the battery charger housing either directly across the terminals of a 6–12 volt automobile battery or through a cigarette outlet or light outlet on the instrument panel of an automobile. A plurality of different value current adjusting (voltage dropping) resistors are provided and preferably molded into the housing along with a means for selectively connecting a desired value current adjusting resistor in circuit relationship with the recharging direct current voltage source and the internal contact means of the different size battery receiving compartments for adjusting the value of the charging current supplied to the compartments to preselected desired values in accordance with the ratings of the small battery being recharged in the respective compartments.

In one form of the invention additional receptacles are formed in the housing for receiving additional plug-in resistors and serve to electrically connect additional plug-in resistors in parallel circuit relationship with the molded-in current adjusting resistor for a particular compartment for appropriately adjusting the current value supplied to the given battery receiving compartment to a different current value whereby the battery receiving compartment can accommodate batteries of the same physical size but requiring different recharging currents.

In still another form of the invention a further receptacle is formed in the housing for receiving a detachable, thermally sensitive switch in the form of a bimetal switch and serves to connect the bimetal thermally sensitive switch in series circuit relationship with the internal contacts of at least one of the battery receiving compartments whereby the thermally sensitive switch physically senses the temperature of a battery being recharged and interrupts the recharging current upon an overtemperature condition being sensed. With this arrangement, upon a battery cooling down to a predetermined temperature, the bimetal, thermally sensitive switch automatically reestablishes the charging current and the recharging current is cycled on and off while maintaining the temperature of the small battery being recharged within safe limits.

In still another form of the invention, in place of the molded-in different value current adjusting resistors, the conductors used to connect the external contacts on the battery housing to the automobile battery recharging source are formed from resistive cables and resistive cables having different values of resistance are used to energize the different battery receiving compartments whereby the charging current supplied to a given compartment is appropriately adjusted to the rating of the batteries being recharged.

In still a different form of the invention, the plurality of different value current adjusting resistors is comprised by a single multi-tap resistor and a selector switch is provided to selectively connect a desired value current adjusting resistance in circuit relationship with the automobile battery recharging direct current voltage source and the internal contact means of a selected one of the different size battery receiving compartments.

BRIEF DESCRIPTION OF DRAWINGS

Other objects, features and many of the attendant advantages of this invention will be appreciated more readily as the same becomes better understood by reference to the following detailed description when considered in connection with the accompanying drawings, wherein like parts of each of the several figures are identified by the same reference character and wherein.

DETAILED DESCRIPTION OF PREFERRED EMBODIMENTS

Figure 1:
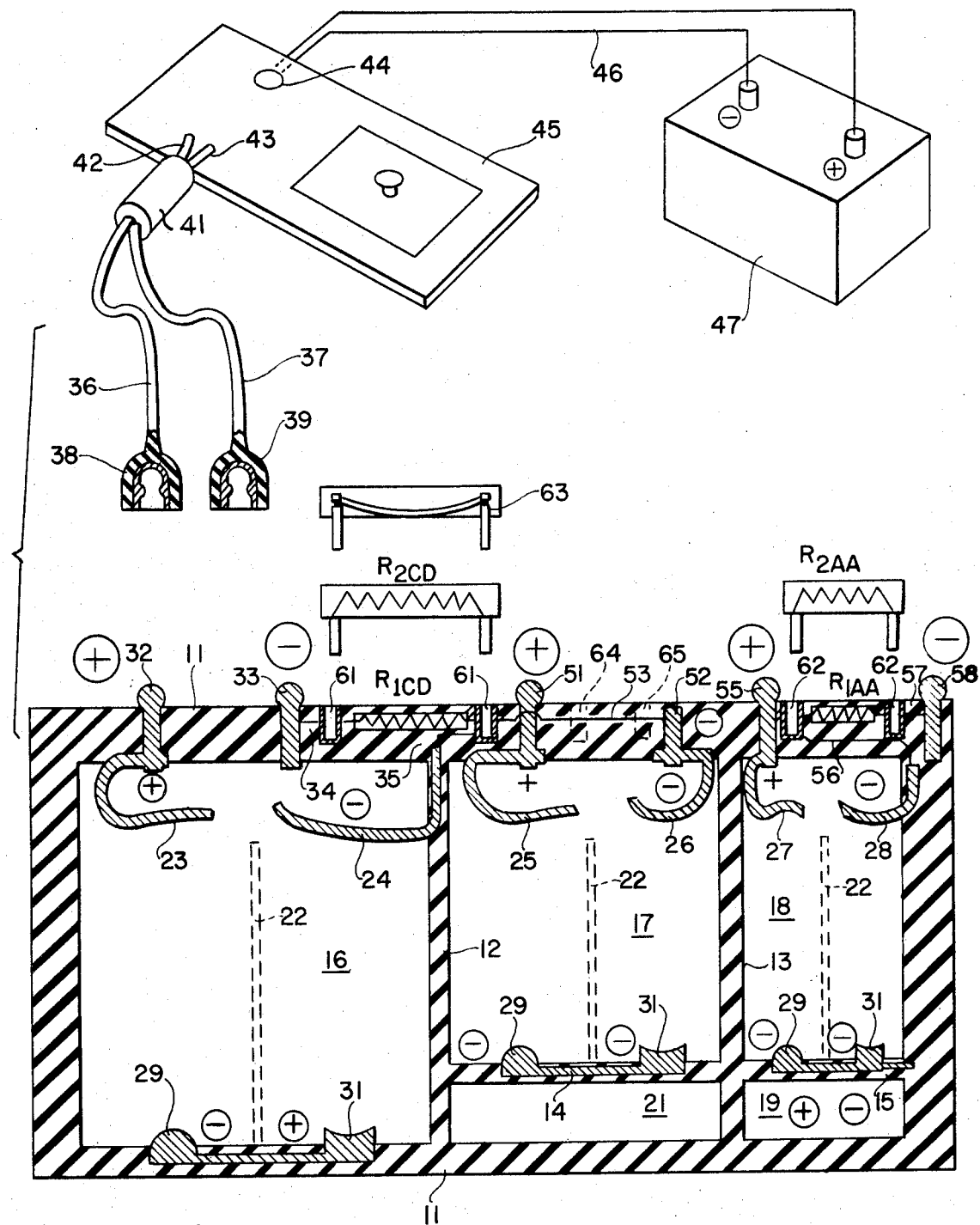
FIG. 1 is a longitudinal sectional view of a new and improved, low cost, universal, multi-purpose battery charger constructed in accordance with the invention and adapted to be energized from a 6–12 volt automobile battery via the cigarette lighter outlet on the instrument panel of an automobile.

FIG. 1 is a longitudinal sectional view of a low cost, universal, multi-purpose battery charger constructed in accordance with the invention and illustrates the manner in which the battery charger is directly energized from a 6–12 volt automobile battery so as to obviate the need for alternating current conversion components such as transformers, rectifiers, filter capacitors and the like since pure direct current voltage is used as the primary charging current source. The battery charger is comprised by a housing 11 which preferably is fabricated from a molded insulating material of any known composition. The housing 11 including a plurality of insulating partitions 12, 13, 14 and 15 for dividing the interior of the housing into a plurality of different size small battery receiving compartments 16, 17, 18 and 19. The compartment 16 is physically dimensioned to receive "D" sized batteries, compartment 17 is dimensioned to receive "C" size batteries, compartment 18 is dimensioned to receive "A—A" sized batteries and compartment 19 as well as compartment 21, which otherwise might constitute leftover, unused space, can be employed to accommodate different, odd-sized batteries such as a 9 volt, rectangular-shaped, nickel cadmium rechargable battery where the user has need for accommodating such odd-sized small batteries. However, the following description will be concerned primarily with the "D", "D" and "A—A" sized batteries since these are standard sizes and there is a generally recognized widespread need for recharging batteries of this type.

Each of the battery receiving compartments, 16, 17 and 18 is physically proportioned to receive two "D", "C" or"A—A" batteries connected in series circuit relationship in order that two batteries of each different size can be recharged simultaneously. If only a single battery needs recharging, all that is required is that a good battery be placed in the additional position within the compartment to close the charging circuit. As long as the recharging current is maintained within the manufacturers specification, no damage will be done to the additional, fully-charged battery by using it in this manner. Alternatively, small jumper conductors could be used within the compartment in order to close the charging circuit. Slide-in plastic dividers shown at 22 are provided in each of the compartment 16, 17 and 18 to assist in securing the batteries to be recharged within the different compartments.

Internal contact means are provided in each of the battery receiving compartments in the form of spring contacts 23 and 24 in the "D" compartment 16, 25 and 26 in the "C" compartment 17 and 27 and 28 in the "A—A" compartment 18. The spring contacts 23 and 24, 25 and 26, and 27 and 28 coact with opposltely disposed common contacts 29 and 31, respectively, formed in each of the compartments 16, 17 and 18, respectively, for physically engaging the terminals of the respective different size small batteries to be recharged in the respective compartments, and to establish a closed electrical circuit through the batteries being recharged. It will be noted that the respective pairs of common contacts 29 and 31 in each of the compartments are electrically interconnected through suitable molded-in conductors disposed within the insulating, partitioning walls of the housing 11. The compartment divider walls, may be injection or transfer molded simultaneously with the formation of the outer housing casing or walls from the same plastic insulating material, and all wiring conductors, feed through contacts and posts, resistors and the like, are embedded in the molded insulating plastic material at the time of the fabrication of the housing 11. Alternatively, certain of the contacts or conductors or resistors can be discrete components that are subsequently placed after the initial fabrication of the housing. However, for cost reduction purposes it is preferred that all such conductors, resistors, feed through contact posts, etc. be set in place during an essentially one step molding process of the housing 11 to avoid the need for the subsequent processing steps that would be required to provide such components, and would add to production cost of the charger.

External contact means are mounted on the exterior of the housing 11 and are electrically connected through suitable molded-in conductive paths to respective ones of the internal contact means for connecting the different size small batteries disposed in the compartments 16, 17 and 18 in circuit relationship with a recharging direct current voltage source. The external contact means for the "D" battery compartment 16 is comprised by a pair of feed-through conductive posts 32 and 33 having snap-on cable contacts formed on their upper or exposed ends. The post 32 extends through the outer casing of the housing 11 and contacts the internal spring contact 23. The conductive post 33 is electrically connected through an internal molded-in electrical conductor 34, a molded-in current adjusting resistors $R_{1CD}$, and a molded-in conductor 35 to the internal spring contact 24. By this construction, it will be seen that a closed electrical recharging circuit will be formed through the conductive post 32, spring contact 23, fixed contacts 29 and 31 and the two "D" batteries disposed in the "D" battery compartment 16, spring contact 24, embedded conductor 35, molded-in current adjusting (voltage dropping) resistor $R_{1CD}$ and external contact post 33, for supplying recharging current to the rechargable "D" sized batteries disposed in each of the halves of the compartment 16.

In order to supply a charging direct current to the batteries to be recharged in compartment 16, a pair of insulating conductors 36 and 37 are provided having snap-on terminal contacts 38 and 39 for snap-on connection to the external contact posts 32 and 33. The insulated conductors 36 and 37 at the opposite ends from the snap-on contacts 38 and 39 are connected to a suitably designed slide-in contact member 41 having external contacts 42 and 43 that mate with corresponding contacts of a cigarette lighter receptacle 44 usually found on the instrument panel 45 of most automobiles. Upon the slide-in contact member 41 being inserted in the cigarette lighter outlet 44, electrical connection will be provided over conductors 46 comprising a part of the automobile wiring system to the plus and minus terminals of a 6-12 volt automobile battery.

In the above manner, a substantially "pure" direct current charging voltage can be applied to the external contacts 32 and 33 of the low cost battery charger through only passive components without requiring high cost alternating current conversion components. By properly proportioning the current adjusting resistor $R_{1CD}$, the value of this charging current can be proportioned to lie within the recommended recharging current value of the rechargable small "D" sized batteries. It should be noted that the low cost battery charger is designed primarily for recharging nickel-cadmium and rechargable alkaline batteries as well as some rechargable dry cell batteries. The manufacturers of these rechargable batteries, guarantee their batteries only under conditions where the batteries are recharged in accordance with their recommended instructions. For "D" size (as well as "C" size) Ni-Cd or rechargable alkaline batteries, the recommended charging current is of the order of 80-100 milliamperes. Accordingly, the current adjusting resistor $R_{1CD}$ should be proportioned to maintain the recharging current through the "D" batteries in compartment 16 to within this value.

As noted above both the "C" size and "D" size nickel-cadmium and rechargable alkaline batteries require the same value recharging current. Because of this fact, the "C" compartment 17 includes only one additional external contact post 51 of the same design as post 32 and 33 and which is directly connected to the internal spring contact 25. The spring contact 26 is electrically connected to a post 52 embedded in the outer casing of housing 11 that serves to secure spring contact 26 to the housing. Post 52 is connected through an embedded conductor 53 connected to one end of the current adjusting resistor $R_{1CD}$ in common with the conductor 35. By reason of this construction, the resistor $R_{1CD}$ can serve as a common current adjusting resistor for both the "D" compartment 16 and the "C" compartment 17, and the external contact post 33 can serve as a common negative terminal contact for both compartments.

When it is desired to recharge "C" size Ni-Cd or rechargeable alkaline batteries, after placement of the batteries within the compartment all that is required is that the clip-on contactor 39 be placed-on the negative contact post 33 and the positive contactor 38 be snapped-on over the positive contact post 51. Upon making these connections, it will be seen that positive charging current again will be supplied from the 6-12 volt battery over conductor 56, cigarette outlet 44, contact 41, conductors 36 and 37 to the contacts 51 and 33 respectively. From external contact 51 the current path can be traced through the spring contact 25, one of the "C" batteries being recharged, fixed contacts 29 and 31, the second "C" battery being recharged, spring contact 26, post 52, embedded conductor 53 and current adjusting resistor $R_{1CD}$ back to the negative contact post 33. It will be seen therefor that the act of selecting or placement of the snap-on conductor 36 and 37 serves as a means for selecting which compartment will be energized and therefore as a means for selectively connecting a desired value current adjusting resistor in circuit relationship with the recharging direct current automobile battery voltage source 47 and the internal contact means 23, 24 or 25, 26 for the different size battery receiving compartments to thereby adjust the value of the charging currents supplied to the compartments to a preselected desired value.

The manufacturers of rechargable "A—A" Ni-Cd and alkaline batteries recommend a recharging current of the order of 40-50 milliamperes, and accordingly a substantially different value of charging current is required for this size battery. To accommodate this requirement the "A—A" compartment 18 includes an external contact post 55 that is through connected to the internal spring contact member 27. The internal spring contact member 28 in compartment 18 is electrically connected through an internal conductor 56 to the left-hand terminal of a second current adjusting resistor $R_{1AA}$ having its righthand terminal connected through a conductor 57 to an external contact post 58. The current adjusting resistor $R_{1AA}$ again is a molded-in resistor designed to drop the current from the 6-12 volt battery 47 down to a current of the order of 40-50 milliamperes for recharging "A—A" sized batteries disposed in compartment 18 for recharging purposes. Again, it will be seen that by appropriately connecting the snap-on conductors 36 and 37 to the appropriate snap-on external contact post 55 and 58, selective recharging of the "A— A" sized batteries in compartment 18 can be accomplished. Such selective energization of the various different sized compartments 16, 17 or 18 by appropriate connection of the snap-on conductors 36 and 37 avoids the need (and hence additional cost) of switches, contactors of the like for selectively energizing a desired compartment, and hence further reduces the cost of the universal, multipurpose, battery charger. It should be noted, that while the conductors 36 and external contacts have been indicated as using snap-on terminal contactors, any known, readily detachable terminal connector design could be employed such as pressure clips, threaded stud and screw-on cap arrangement, mated male and female prong connectors, or the like.

In addition to the above specifically mentioned rechargable small batteries, the universal, multi-purpose battery charger comprising the present invention also can be used to charge rechargable dry cell batteries by appropriate adjustment of the charger. In this regard, it should be noted that currently available battery chargers for nickel-cadmium and rechargable alkaline batteries operating off of 110 volt household alternating current, are designed strictly for recharging only nickel-cadmium or rechargable alkaline batteries. If one uses these available charges for reconditioning "dry cells" the battery charger would be ruined. Similarly, available alternating current "dry cell" battery reconditioning chargers would be ruined if they were employed to recharge nickel-cadmium or rechargable alkaline batteries. The present universal multi-purpose battery charger also can be used for recharging "dry cells" batteries by appropriate conditioning without in anyway damaging the charger.

For the above noted purpose, additional plug-in resistor elements shown at $R_{2CD}$ and $R_{2AA}$, are provided as plug-in attachments for the present universal battery charger. Each of these plug-in resistors is designed to be plugged into suitable receptacles shown at 61 for plug-in resistor $R_{2CD}$ and at 62 for plug-in resistor $R_{2AA}$. The receptacles 61 and 62 are molded-in, conductive receptacles for electrically connecting the plug-in resistor $R_{2CD}$ and $R_{2AA}$ in parallel electrical circuit relationship with their respective associated current adjusting resistors $R_{1CD}$, $R_{1AA}$, respectively. The plug-in resistor $R_{2CD}$ is proportioned so that the combined resistance $(1/R_{1CD}) + (1/R_{2CD})$ provides the desired value increased charging current for charging "D" and "C" sized "dry cell" batteries. Similarly, the plug-in resistor $R_{2AA}$ is proportioned so that the combined resistance $(1/R_{1AA}) + (1/R_{2AA})$ provides a desired increased value charging current for charging "AA" sized "dry cell" batteries.

Under conditions where the low cost universal multipurpose battery charger is to be employed in recharging "dry cell" batteries at higher charging current rates, it may be desirable to include an additional optional feature for controlling thermal cycling on and off of the recharging process. For this purpose, an additional, plug-in, thermally sensitive, bimetal switch 63 is provided. The bimetal switch 63 is designed to be plugged into optional receptacles indicated in phantom at 64 and 65 for electrically connecting the bimetal switch 63 in series circuit electrical relationship with the charging circuit to the "C" compartment 17 internal contacts 25 and 26. Similar optional receptacles for receiving plug-in thermally sensitive bimetal switches may be provided for each of the "D" and "A—A" compartments; however, only the switch for the "C" compartment is shown for convenience. With this arrangement where a higher charging current is provided to the rechargable small battery contained in each of the respective compartments 16, 17 or 18, the thermally sensitive bimetal switch 63 will break the charging circuit automatically after a reasonable amount of overheating upon sensing that overtemperature condition. Upon the batteries being recharged cooling down to within specified values, the circuit would again automatically be closed so as to resume recharging. Thereafter, if the battery again tends to overheat, the circuit will cycle on and off while maintaining the recharging process within specified temperature limits for the batteries being recharged. While the temperature controlling, plug-in bimetallic switch devices 63 have been described primarily for use in recharging "dry cell" batteries, it is of course possible to use these devices in recharging nickel cadmium or rechargable alkaline batteries at higher charging current rates than specified where the user might desire to do so in order to accelerate the charging operation.

Figure 2:
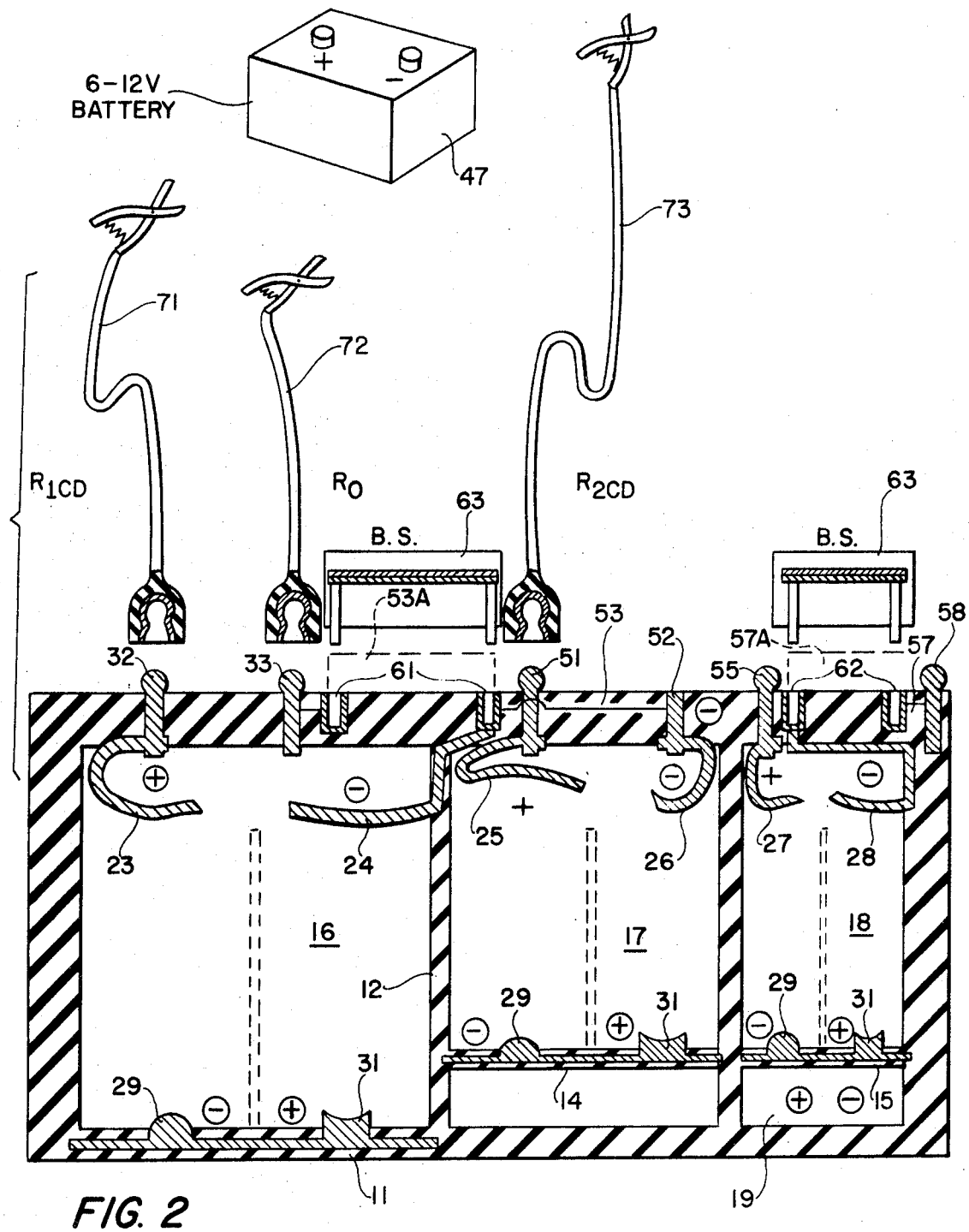
FIG. 2 is a longitudinal sectional view of a second form of the low cost, universal battery charger according to the invention and is adapted to be energized directly from the plus and minus terminals of a 6–12 volt automobile battery through suitably proportioned resistive conductors.

FIG. 2 is a schematic illustration of an alternative form of low cost, universal battery charger constructed in accordance with the invention. In the embodiment of the invention shown in FIG. 2, the molded-in current adjusting resistors have been eliminated and in their place resistive conductor cables 71, 72 and 73 are used. Each of the conductor cables 71, 72 and 73 has a predesigned resistivity for limiting the charging current supplied to the battery receiving compartments 16, 17 and 18 in accordance with the manufacturer's specification for recharging currents. These resistive cables are used in place of the normal (low resistivity) conductors 36 and 37 employed with the embodiment of the invention shown in FIG. 1. For most users three different resistor cables would be employed. The first cable, for example 71, would be designed to provide the exact resistivity $R_1$ required to provide 100 milliamperes charging current through either the "D" or "C" battery receiving compartments. The second cable required, indicated at 72, would be a normal or regular cable (low resistivity) that provides little or no current limiting. It will be noted that with this arrangement, the conductors 71 and 72 are provided with the standard spring biased pressure clip arrangements for clipping directly to the positive and negative terminals of the 6-12 volt automobile battery 47. With conductor 71 clamped to the positive terminal of the 6–12 volt battery 47 and snapped on the external contact 32, and conductor 72 clipped to the negative terminal and external snap-on contact 33, 100 milliampere charging current will be supplied to either the "D" or "C" battery receiving compartments 16 or 17, or both.

It will be noted that the negative contact 26 in the "C" compartment 17 is connected through an internal conductor 53 and either through an extension 53A of the internal conductor 53 to external contact negative terminal 33, or alternatively through a bimetal switch 63 disposed in receptacle 61 formed in the housing for receiving a plug-in bimetal switch 63. The bimetal switch 63 and receptacle 61 are provided in only those models wherein it is desired to maintain temperature control over the battery charging operations. Otherwise if the additional temperature control feature is not required or desired, the internal molded conductor 53 would be extended in the manner shown in the phantom lines at 53A to electrically interconnect the two spring contacts 24 and 26 to the external contact 35 for connection to the 6-12 volt automobile battery 47. By providing the third resistive cable 73 having a resistance $R_{2CD}$ proportioned to supply the higher charging current needed for rechargable "dry cells" of the "C" and "D" sizes and substituting the 73 cable for the 71 cable, recharging of rechargable "dry cells" can be accomplished. Other alternative arrangements such as connecting proper resistivity cables in parallel in place of separate desired resistivity cables such as 71 and 73 will be suggested to those skilled in the art.

The charging currents supplied to the "A—A" compartment 18 are provided from the 6–12 volt battery 47 with resistive cables similar to those shown at 71-73 but especially tailored to provide the desired 40-50 milliampere recharging current required for "A—A" batteries. As an alternative two cables such as 71 could be connected in series to obtain the higher resistance required to reduce the 80-100 milliampere current for the "D" and "C" batteries down to the 40-50 milliamperecurrent required for the "A—A" batteries. The resistive cables 71 and 73 are made of a resistance metal wire such as "nichrome" "constantan", etc with insulating coatings and the required readily detachable terminal connectors at each of their ends. The desired resistance may be obtained either by varying the lenghth of a known resistivity wire or alternatively using wires of different resistivity as will be suggested to those skilled in the art. Similar to the "D" and "C" compartments, the " A—A" compartment likewise will be provided either with a molded-in conductor 57 and extension 57A shown in phantom that connects the spring contacts 28 to external contact 58,or alternatively receptacles 62 are provided for a plug-in bimetal switch 63 used in those models where the temperature control feature is desired. In all other respects, the embodiment of the invention shown in FIG. 2 will operate in the manner described previously with respect to FIG. 1.

Figure 4:
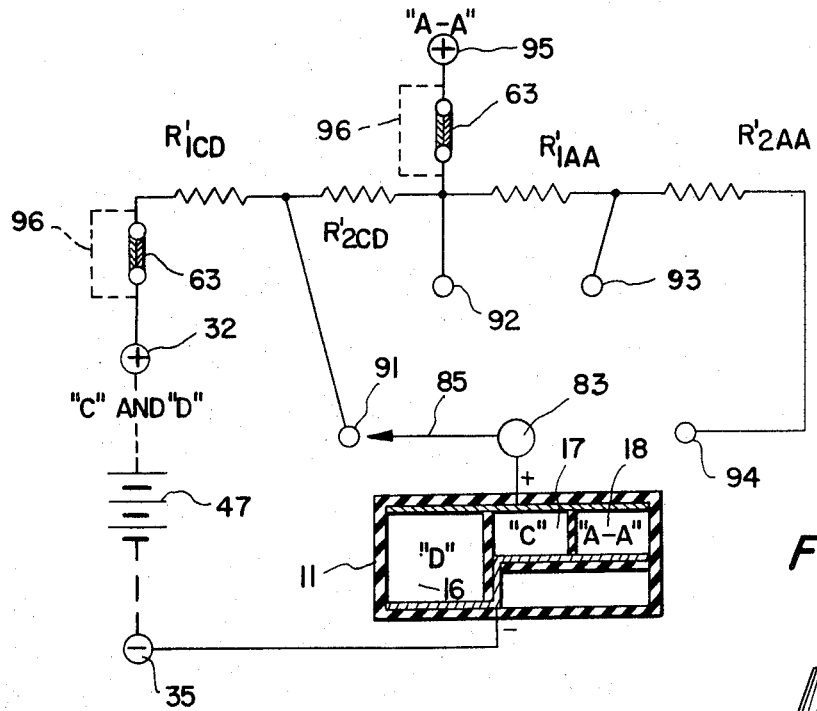
FIG. 4 is a schematic circuit diagram illustrating electrical connections of the multi-tap resistor used in conjunction with the battery charger of FIG. 3.
Figure 3:
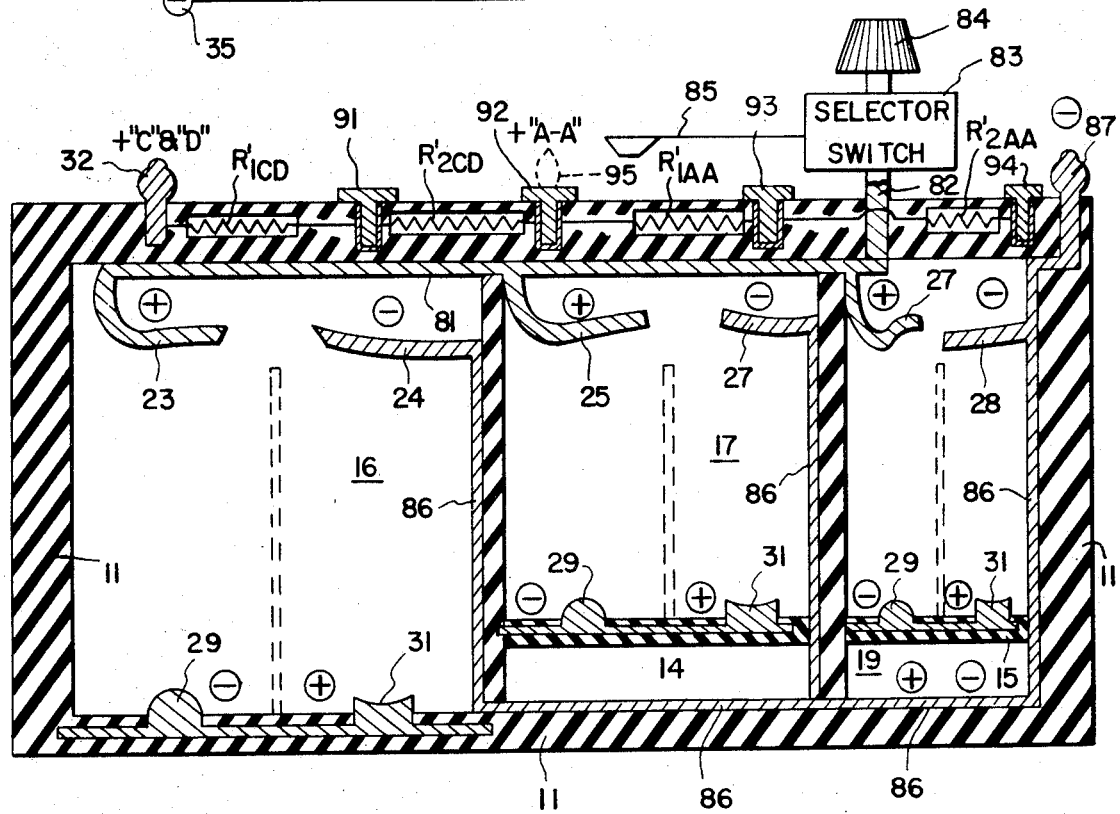
FIG. 3 is a longitudinal sectional view of still another form of low cost, universal battery charger according to the invention which utilizes a single multi-tap resistor and selector switch arrangement for deriving the desired different charging currents used in the multipurpose charger.

FIGS. 3 and 4 illustrate still another embodiment of the invention wherein the desired value charging current is supplied to the respective different sized battery receiving compartments 16, 17 and 18 via a multi-tap series connected resistor and selector switch arrangement. In FIG. 3, it will be seen that all of the positive polarity internal contact members 23, 25 and 27 of all three battery receiving compartments 16, 17 and 18 are connected in common to a conductor 81 molded in or attached to housing member 11 and electrically connected through a through connector 82 to one of the terminals of a multi-point selector switch 83 having a control knob 84 and moveable switch arm 85. In a similar manner, all of the negative polarity,internal spring contact members 24, 26 and 28 in all of the battery receiving compartments 16, 17 and 18 are connected through a common internal conductor 86 that in turn is electrically connected to an external contact member 87 that serves as the negative input terminal for the battery charger. The positive input terminal for the battery charger is comprised by an external contact member 32 of the snap-on connector type. The external contact member 32 is serially connected by molded-in conductors through a plurality of different value, molded-in, current adjusting resistors $R_{1CD'}$, $R_{2CD'}$, $R_{1AA'}$ and $R_{2AA'}$. The junctures of each these resistors is electrically connected to a contact pad 91-94 which are designed to be selectively engaged by the moveable switch contact arm 85. In addition, a second external contact member shown in phantom at 95 can be provided which is connected directly to the middle switch contact pad 92. Again, if desired, bimetal switches such as shown at 63 in FIG. 4 can be connected in series with the charging current paths for providing thermal control over the charging operation. Where this additional control feature is not required or desired, a straight through conductor as shown in the dotted outline form at 96 would be employed. While the multi-tap series resistor $R_{1CD'}$, $R_{2CD'}$, etc have been shown as comprising molded in resistors, it is of course possible to use externally secured descrete resistors in their place should such fabrication provide desirable either from a servicing point of view or for reducing the cost of manufacture.

FIG. 4 best illustrates the manner of operation of the battery charger shown in FIGS. 3 and 4. It will be seen that the charger is energized from a normal 6–12 volt automobile storage battery such as that indicated in phantom at 47 connected to the positive and negative terminal 32 and 35 respectively through suitable insulated conductors having readily detachable terminal connectors for facilitating attachment to this DC source of charging voltage. It will be seen that by closing the movable contact switch arm 85 on the fixed contact pad 91, only the resistor $R_{1CD'}$ would be switched into the charging circuit to the battery receiving compartments 16, 17 and 18. By proportioning this resistor so that it supplies the higher charging current required for rechargable "dry cells" it will be seen that in this condition, the battery charger is adjusted to provide for recharging of "C" and "D" size rechargable "dry cells". Upon switching the contact arm 85 to the fixed contact 92, both resistors $R_{1CD'}$ and $R_{2CD'}$ are switched into the charging circuit. Through appropriate design of the value of these resistors, the desired 80-100 milliamperes charging current for "C" and "D" sized nickel-cadmium and rechargable alkaline batteries is obtained. By switching the moveable contact arm 85 to the fixed contact 93, and connecting the 6-12 volt automobile battery across terminals 35 and 95, the required current or charging rechargable "A—A" "dry cells" can be obtained. Thereafter, upon switching the contact arm 85 to the fixed contact 94, the desired 40-50 milliampere charging current for "A—A" sized nickel-cadmium and rechargable alkaline batteries can be obtain.

In addition to the above variety of recharging currents, it can be noted that even smaller value charging currents can be obtained by moving the contact arm 85 to either of the fixed contacts 93 and 94 with the 6–12 volt automobile battery 47 connected across the input terminals 32 and 35. In this manner a wide large variety of different charging currents can be obtained across the battery receiving compartments 16, 17 and 18 for use with odd sized batteries requiring different rates of charging currents. It should be noted in this respect that the additional compartments such as 19 are provided for accommodating such odd sized batteries. For example, there is a 9 volt rectangular shaped battery that could easily be accommodated in the compartment 19, appropriate connections for energizing the odd sized compartments such as 19 have not been illustrated since it is believed obvious from the foregoing description how the compartment could be appropriately constructed to receive these different, odd-sized battery configurations. Where the users needs require recharging capability for such different odd-sized batteries of essentially non-standard configuration, and which have not come in to widespread use, such modification could be made either at the time of manufacture of the charger, or by the user himself.

From the foregoing description it will be appreciated that the present invention provides a new and improved, low cost universal, multipurpose battery charger for recharging a multiplicity of different size, small batteries of the rechargable "dry cell" type. The lost cost multi-purpose charger uses a direct current charging source such as a 6–12 volt automobile battery that supplies pure direct current thereby obviating the need for costly alternating current conversion components required in battery chargers heretofore available. The charger is comprised by a housing of molded insulating construction having a plurality of separate sized compartments each dimensioned to receiver respective different ones of the small batteries to be recharged. Internal contact means are secured within each of the compartments for physically engaging the terminals of the respective sized batteries to be recharged in that compartment, and to establish a closed electrical circuit through the battery. External contact means are mounted on the exterior of the housing and are electrically connected to respective ones of the internal contact means for connecting the different size batteries disposed in the compartments in circuit relationship with a recharging direct current voltage source such as a 6–12 volt automobile battery. Insulated conductor means having readily detachable terminal connectors are provided for selectively connecting the external contact means on the battery charger housing to the recharging direct current voltage source to thereby energize the different size battery receiving compartments. A plurality of different value current adjusting resistors are provided along with a means for selectively connecting a desired value current adjusting resistor in circuit relationship with the recharging direct current voltage source and the internal contact means of the different sized battery receiving compartments for adjusting the value of the charging current supplied to the compartment to preselected desired values within the manufacturer's specification for the batteries being recharged.

Having described several embodiments of a new and improved low cost, universal, multi-purpose battery charger constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What is claimed is:

1. A low cost, universal battery charger for primarily recharging different size nickel-cadmium and alkaline rechargeable small batteries of the "AA", "C" and "D" or "dry cell" type comprising a housing having a plurality of separate size compartments each dimensioned to receive respective different ones of the small batteries to be recharged, said housing and compartmentation partitions being fabricated from a molded electrical insulating material, internal contact means secured within each of the compartments for physically engaging the terminals of the respective size battery to be recharged in that compartment and to establish a closed electrical circuit therethrough, external contact means mounted on the exterior of the housing and electrically connected to respective ones of the internal contact means for connecting the different size batteries disposed in the compartments in circuit relationship with a recharging direct current voltage source, conductor means having readily detachable terminal connectors for selectively connecting the external contact means to a recharging direct current voltage source to thereby energize the different size battery receiving compartments, a plurality of different value current adjusting resistors, means for selectively correcting a desired value current adjusting resistor in circuit relationship with the recharging direct current, voltage source and the internal contact means of the different size battery receiving compartments for adjusting the value of the charging current supplied to the compartments to preselected desired values, the plurality of different value current adjusting resistors being integrally formed and molded within the walls of the electrically insulated housing and preformed interconnecting conductors electrically interconnecting respective different ones of the molded-in current adjusting resistors in series circuit relationship between the external contact means and the internal contact means of the respective battery receiving compartments.

2. A low cost universal battery charger according to claim 1 further including electric plug receptacle means formed in the insulating housing and connected to said preformed interconnecting conductors for receiving the terminals of at least one additional plug-in resistor, the receptacle mans serving to electrically connect the additional plug-in resistor in parallel circuit relationship with a molded-in current adjusting resistor for appropriately adjusting the current value supplied to a given battery receiving compartment to a different current value whereby the battery receiving compartment can accommodate batteries of the same physical size but requiring different recharging current values.

3. A low cost universal battery charger according to claim 2 further including second receptacle means formed in the insulating housing for receiving a detachable thermally sensitive element, said second receptacle means serving to connect the thermally sensitive element in circuit relationship with the internal contacts of at least one of the battery receiving compartments whereby the thermally sensitive element physically senses the temperature of a battery being recharged in order to interrupt or reduce the recharging current upon an over-temperature condition being sensed.

4. A low cost universal battery charger according to claim 1 wherein each of the different size battery receiving compartments are dimensioned to receive at least two batteries of the same physical size and voltage rating, the internal contact means electrically connect the same size batteries in each compartment in series circuit relationship to the external contact means through the respective molded in current adjusting resistors and preformed interconnecting conductors, there being at least three battery receiving compartments designed to receiver "AA", "C" and "D" size batteries, respectively, the recharging direct current voltage source comprises an automobile battery or other similar convenient source of direct current voltage of suitable voltage and current rating, the readily detachable connectors comprise pressure clips, snap-on contacts, threaded stud and screw-on caps, mated male and female prong connectors, or the like, designed to attach directly to the terminals of the automobile, an automobile light outlet, or other similar convenient source of direct current voltage of suitable voltage and current rating.

5. A low cost universal battery charger according to claim 4 wherein the molded insulating housing further includes electric plug receptacle means formed in the insulated housing and connected to said preformed interconnecting conductors for receiving the terminals of an additional plug-in resistor, the receptacle means serving to electrically connect at least one additional plug-in resistor in parallel circuit relationship with at least one of the molded-in current adjusting resistors for appropriately adjusting the charging current supplied to at least one of the battery receiving compartments to values suitable for recharging batteries of the same physical size but different current ratings.

6. A low cost universal battery charger according to claim 5 further including second electric plug receptacle means formed on the molded insulating housing and connected to said preformed interconnecting conductors for receiving a plug-in thermally sensitive element the second receptacle means serving to electrically connect the plug-in thermally sensitive element in circuit relationship with the recharging direct current voltage source in order to interrupt or reduce the recharging current supplied to a small battery being recharged in response to an overtemperature condition being sensed by the thermally sensitive element.

7. A low cost, universal battery charger for primarily recharging different size rechargeable small batteries of the "AA", "C" and "D" of "dry cell" type comprising a housing having a plurality of separate sized compartments each dimensioned to receive respective different ones of the small batteries to be recharged, said housing and compartmentation portions being fabricated from a molded electrical insulating material, internal contact means secured within each of the compartments for physically engaging the terminals of the respective size battery to be recharged in that compartment and to establish a closed electrical circuit therethrough, external contact means mounted on the exterior of the housing and electrically connected to respective ones of the internal contact means for selectively connecting the different size batteries disposed in the compartments in circuit relationship with a recharging direct current voltage source in accordance with which external contact means is selectively connected to the recharging direct current source, conductor means having readily detachable terminal connectors for selectively connecting a desired set of external contact means to a recharging direct current voltage source to thereby selectively energize respective ones of the different size battery receiving compartments, a plurality of different value current adjusting resistors, means for selectively connecting a desired value current adjusting resistor in circuit relationship with the recharging direct current voltage source and the internal contact means of a selected one of the different size battery receiving compartments for adjusting the value of the charging current supplied to that compartment to a preselected desired value, the plurality of different value current adjusting resistors being integrally formed and molded within the walls of the electrically insulating housing and preformed interconnecting conductors interconnecting respective different ones of the current adjusting resistors in series circuit relationship between the external contact means and the internal contact means of the respective battery receiving compartments and one of the molded-in resistors serves as a common current adjusting resistor for two or more battery receiving compartments.

8. A low cost universal battery charger according to claim 7 further including electric plug receptacle means formed in the insulating housing and connected to said preformed interconnecting conductors for receiving the terminals of at least one additional plug-in resistor, the receptacle means serving to electrically connect the additional plug-in resistors in parallel circuit relationship with a molded-in current adjusting resistor for appropriately adjusting the current value supplied to a given battery receiving compartment to a different current value whereby the battery receiving compartment can accommodate batteries of the same physical size but requiring different recharging current values.

9. A low cost universal battery charger according to claim 8 further including second electric plug receptacle means formed in the insulating housing for receiving a detachable thermally sensitive element said second receptacle means serving to connect the thermally sensitive element in circuit relationship with the internal contacts of at least one of the battery receiving compartments whereby the thermally sensitive element physically senses the temperature of a battery being recharged in order to interrupt or reduce the recharging current upon an overtemperature condition being sensed.

10. A low cost universal battery charger according to claim 9 wherein at least one of the external contacts serves as a common contact for two or more compartments, each of the different sized battery receiving compartments are dimensioned to receive at least two batteries of the same physical size and voltage rating, the internal contact means electrically connect the same size batteries in each compartment in series circuit relationship to the external contact means through the respective molded-in current adjusting resistors and preformed interconnecting conductors, there being at least three battery receiving compartments designed to receive "AA", "C" and "D" size batteries, respectively, the recharging direct current voltage source comprises an automobile battery or other similar convenient source of direct current voltage of suitable voltage and current rating, the readily detachable connectors comprise pressure clips, snap-on caps, mated male and female prong connectors, or the like designed to attach directly to the terminals of an automobile battery, a cigarette lighter or light outlet on the instrument panel of an automobile, or other similar convenient source of direct current voltage of suitable voltage and current rating.

* * * * *